(12) United States Patent
Jaramillo et al.

(10) Patent No.: US 6,589,307 B2
(45) Date of Patent: Jul. 8, 2003

(54) INTAKE SCREEN FOR A VEHICLE

(75) Inventors: Jennifer Lynn Jaramillo, Raleigh, NC (US); Jeffrey David Witwer, Clayton, NC (US); Robert Alan Henson, Willow Springs, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/737,159

(22) Filed: Dec. 13, 2000

(65) Prior Publication Data

US 2002/0069624 A1 Jun. 13, 2002

(51) Int. Cl.$^7$ ............................................ B62D 25/10
(52) U.S. Cl. ..................... 55/385.3; 55/357; 55/502; 180/68.6; 123/198 E; 454/158
(58) Field of Search .................... 55/385.3, 385.1, 55/357, 502; 180/84, 68.6; 454/158; 123/198 E

(56) References Cited

U.S. PATENT DOCUMENTS

| 2,128,957 | A | | 9/1938 | Morrison |
| 2,655,091 | A | * | 10/1953 | Geiger ........................ 454/158 |
| 2,796,141 | A | * | 6/1957 | Schreiner ................... 180/68.6 |
| 3,524,398 | A | * | 8/1970 | Winfrey ...................... 454/158 |
| 3,837,149 | A | | 9/1974 | West et al. |

(List continued on next page.)

OTHER PUBLICATIONS

Toro, Toro Groundsmaster 200 Series, 8 Pages, Publication Date—1990, Published In U.S.A.
Toro, Toro Reelmaster 335–D, 4 Pages, Publication Date—1990, Published In U.S.A.
Toro, Toro Groundmaster 300 Series, 10 Pages, Publication Date—1992, Published In U.S.A.
Middlesworth Engineering and Manufacturing Inc., Middlesworth Commercial Flail Lawnmower, 2 Pages, Publication Date—Unknown, Published In U.S.A.
Howard Price Turk Equipment, Turf Blazer 530, 4 Pages, Publication Date—Unknown, Publication Location—Unknown.
Grazer, Grazer Professional Series, 2 Pages, Publication Date—1992, Published In U.S.A.
Jacobsen Textron, Jacobsen HM–11 High Production Lightweight Mowing, 4 Pages, Publication Date—Unknown, Published In U.S.A.
Excel Industries Inc., Hustler Out–Fronts, 8 Pages, Publication Date—Unknown, Published In U.S.A.
Howard Price Turf Equipment, Hydro Power 1280, 6 Pages, Publication Date—Unknown, Published In U.S.A.
Ransomes Textron, Ransomes 951D, 4 Pages, Publication Date—1999, Published In U.S.A.

(List continued on next page.)

*Primary Examiner*—David A. Simmons
*Assistant Examiner*—Minh-Chan T. Pham

(57) ABSTRACT

An air filtering enclosure for a vehicle to minimize the amount of debris entering the radiator of the vehicle is provided. The enclosure forms a shell having a set of interfitting interior and exterior members. Mounted with the interior member are clips designed to mate with a series of compatibly arranged brackets on the vehicle frame. Attached opposite the clips are handles which a user may grasp to easily install and remove the shell from a vehicle. Interior and exterior members form a frame which encases sheets of perforated screening to restrict the introduction of debris into the radiator. The shell is completed with a rubber seal enabling tight sealing of the enclosure to the vehicle on which it is attached.

6 Claims, 9 Drawing Sheets

U.S. PATENT DOCUMENTS

| | | | | |
|---|---|---|---|---|
| 3,941,034 A | * | 3/1976 | Helwig et al. | 454/158 |
| 4,169,501 A | | 10/1979 | Takeuchi et al. | |
| 4,287,961 A | | 9/1981 | Steiger | |
| 4,403,648 A | | 9/1983 | Styok | |
| 4,483,412 A | | 11/1984 | Couturier | |
| 4,531,574 A | | 7/1985 | Hoch | |
| 4,535,862 A | | 8/1985 | LeBlanc | |
| 4,542,785 A | | 9/1985 | Bagnall et al. | |
| 4,606,422 A | | 8/1986 | Jewett | |
| 4,700,534 A | | 10/1987 | Reilly | |
| 4,768,423 A | * | 9/1988 | Boeger | 454/158 |
| 4,881,957 A | | 11/1989 | Shofner | |
| 4,916,902 A | | 4/1990 | Pratt et al. | |
| 4,969,533 A | | 11/1990 | Holm et al. | |
| 5,122,167 A | | 6/1992 | Daniels | |
| 5,284,115 A | | 2/1994 | Imanishi et al. | |
| 5,285,751 A | | 2/1994 | Liegeois et al. | |
| 5,306,332 A | | 4/1994 | Allen | |
| 5,494,006 A | | 2/1996 | Davis, Jr. | |
| 5,570,738 A | | 11/1996 | Christensen | |
| 5,676,197 A | | 10/1997 | Diebold et al. | |
| 5,678,648 A | | 10/1997 | Imanishi et al. | |
| 5,689,953 A | | 11/1997 | Yamashita et al. | |
| 5,785,139 A | | 7/1998 | Freedy et al. | |
| 5,947,219 A | | 9/1999 | Peter et al. | |
| 6,024,164 A | | 2/2000 | Sorbel | |
| 6,036,444 A | | 3/2000 | Barney et al. | |
| 6,058,898 A | | 5/2000 | Freese, V | |
| 6,068,675 A | * | 5/2000 | Tsuda et al. | 55/385.3 |
| 6,105,349 A | * | 8/2000 | Busboom et al. | 180/68.6 |
| 6,136,055 A | * | 10/2000 | Stanek | 55/357 |
| 6,167,976 B1 | | 1/2001 | O'Neill et al. | |
| 6,200,465 B1 | * | 3/2001 | Carawan et al. | 55/357 |

OTHER PUBLICATIONS

Jacobsen Textron, Jacobsen HR–5111, 6 Pages, Publication Date—1999, Published In U.S.A.

Deere & Company, John Deere 1600 Wide Area Mower, 5 Pages, Publication Date—Unknown, Published In U.S.A.

Howard Price Turf Equipment, Hydro–Power 180, 6 Pages, Publication Date—Unknown, Publication Location—Unknown.

* cited by examiner

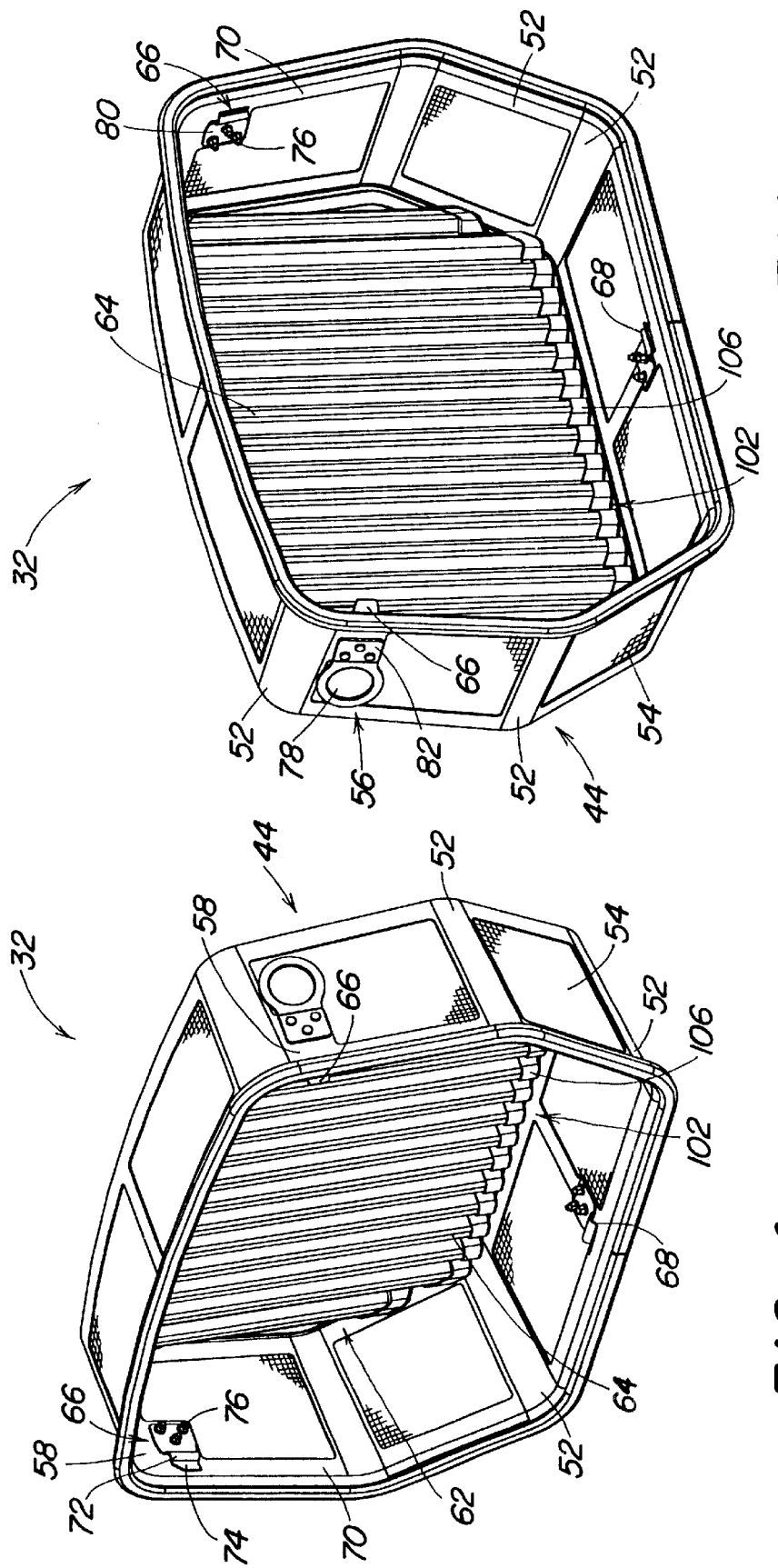

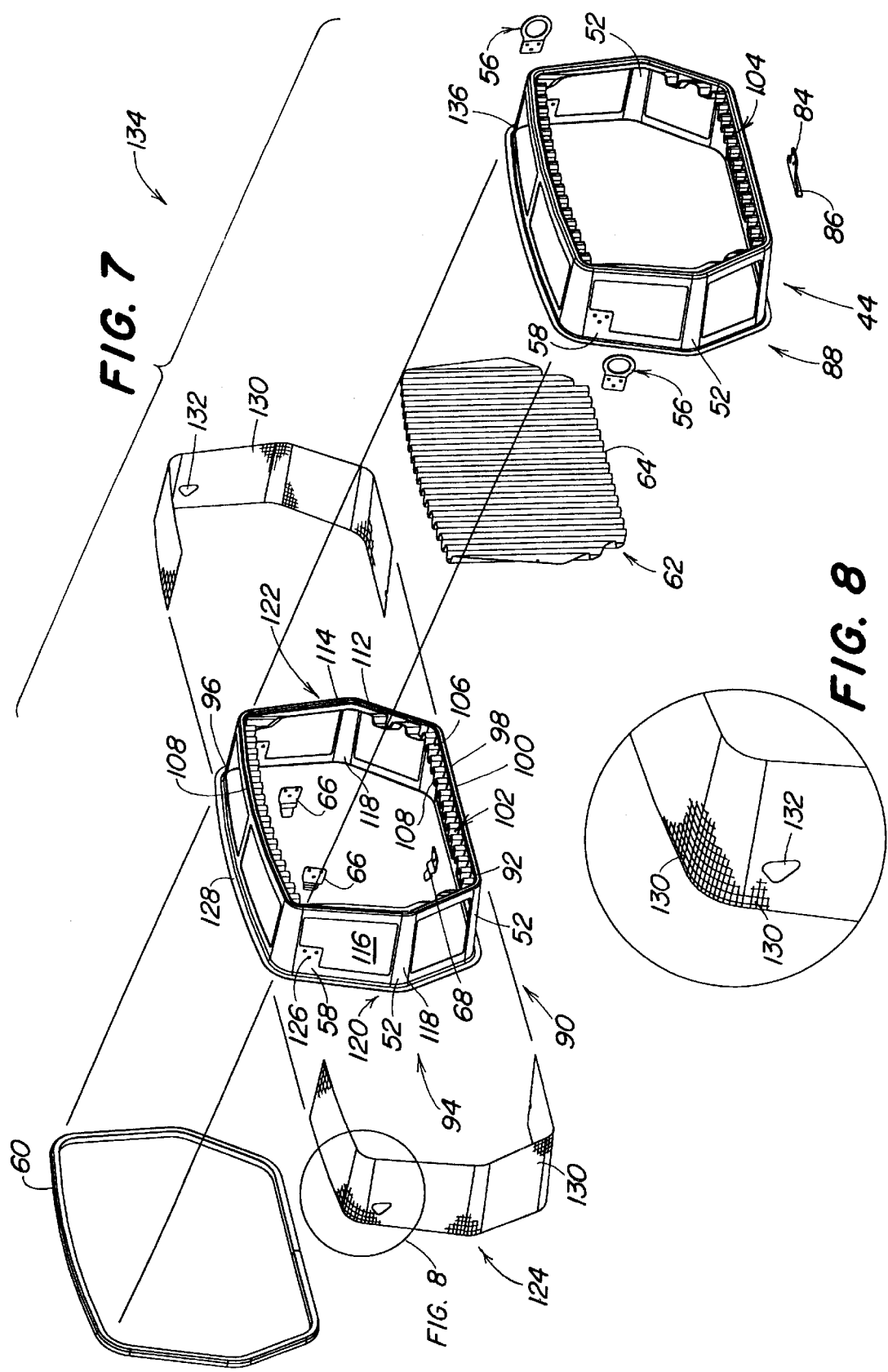

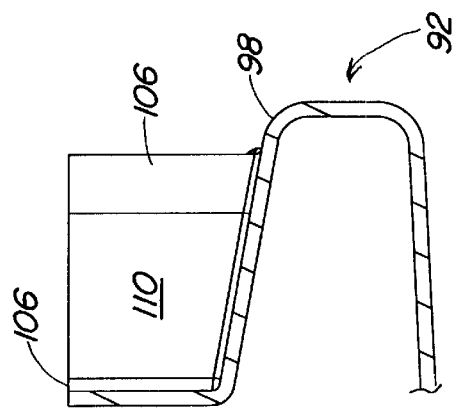
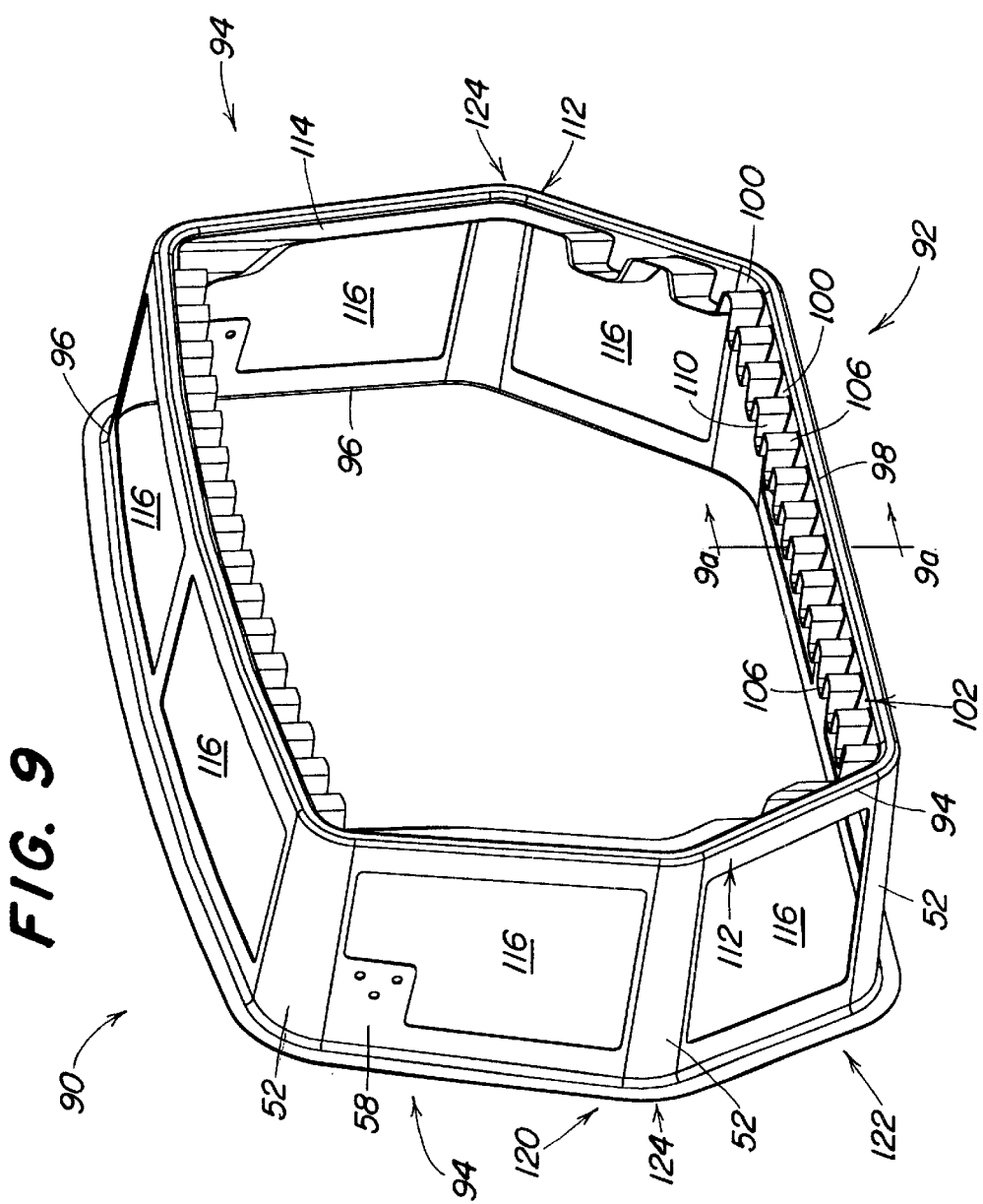

INTAKE SCREEN FOR A VEHICLE

BACKGROUND OF THE INVENTION

1. Field of the Invention

This invention relates to vehicles which operate in environments prone to include airborne debris such as dust and grass clippings, and more specifically, to a screening apparatus which may be clipped onto the vehicle to prevent the entry of such debris into the vehicle radiator and area surrounding the engine.

2. Description of Related Art

Vehicles such as lawn and garden tractors often operate in rather harsh conditions in which debris such as grass clippings and other foreign matter tends to gain entry into the engine area. Introduction of such materials typically causes difficulty for internal combustion engines which rely on a constant air flow to maintain proper cooling of heated liquids flowing through the engine. If cooling of these liquids does not occur, overheating of the engine may result causing the vehicle to experience a decrease in efficiency and extended periods of lost operation.

Maintenance of a relatively constant operating temperature for the engine is accomplished by cooling the liquid used to cool the engine. This is accomplished through passing the liquid through a radiator which is in turn cooled by air passed through it. Typically, a fan draws air in through a grille or other opening on an outside of the engine body and towards the radiator through which the engine liquids circulate. As the heated liquids are drawn through the radiator, they are cooled by the flow of air flowing over openings provided in the radiator construction.

Often, restricting the passage of material through the radiator as air is drawn through it is a screened covering placed in front of the radiator. Previous coverings have taken the form of an apparatus with apertures which is bolted onto either the radiator itself or an associated support structure. Other constructions have included horizontally placed slats through which air is directed towards the radiator.

Screens of the above mentioned kind are sometimes heavy and often necessitate attachment with separate components of the type involving nuts, bolts, and/or rivets. Accordingly, attachment of this type requires the use of tools causing the user to expend time and effort, and in commercial applications unnecessary expense, in the placement, removal and/or installation of the screen. Additional disadvantages include the passage of debris surrounding through the area at which the screen is attached to the radiator or its support structure. Because of this, as debris is introduced into the radiator it may become clogged, with cooling of the heated engine liquids being reduced. Consequently, the engine may experience overheating, causing the operator unwanted delay when attempting to accomplish intended grounds care.

Thus, it would be desirable to provide a lightweight screening enclosure that is easy to install and/or remove from a vehicle. Further, it would be beneficial to provide such an enclosure that is durable, of lightweight construction, and which may be attached and/or removed without the use of tools. Additionally, it would be beneficial to provide such an enclosure that serves to provide a good interface between the vehicle to which it is attached and the peripheral surface of that enclosure so as to increase the effectiveness of the seal with the vehicle. Enabling such a tight seal will allow for the efficient flow of air through the screen and into the radiator, thereby allowing proper cooling of liquid passing therethrough.

SUMMARY OF THE INVENTION

Accordingly, to address the above desires, there is provided a durable, lightweight, and easily removable enclosure. The enclosure acts as a filtration apparatus to effectively remove debris from air flowing towards the radiator. Permitting a durable, while lightweight construction, the enclosure includes a frame assembly which houses screening therebetween. The housing includes frame members constructed of plastic which are adhesively bonded together to prevent entry of debris therein.

Allowing for its easy removal and attachment, the enclosure includes clips on an interior thereof that allow for its removal and attachment to the vehicle without the use of tools, thereby decreasing the time and effort required for that adjustment. This clip-on structure is permanently affixed to the enclosure and permits easy release from and attachment to the vehicle through the use of several spring assisted clips. The clips allow for secure fastening and detachment relative to the vehicle, resulting in the increased confidence of the operator as to that adjustment. Further, given the ability to easily remove the enclosure, periodic cleaning and any necessary maintenance of the radiator and surrounding area may be accomplished quickly.

In addition to the clip structure, a rubber sealing strip is provided on an outer peripheral surface of the enclosure. The strip allows a tight seal between the members of the frame assembly as well as between the entire enclosure and the vehicle to which it is attached. Further, the strip permits the enclosure to be compressably sealed with the vehicle, thereby greatly decreasing the amount of debris which is able to enter the engine area. Thus, the screening enclosure accomplishes maximum filtration of air flowing into the engine block and surrounding area as a result of its sealing capability.

Restriction of debris likely to pass into the engine area is further assisted by the placement of the clips used in attaching the enclosure to the vehicle. The clips are located on an interior of the enclosure. Because of this location, cracks or crevices in which debris might otherwise become lodged and built up are eliminated. Consequently, the clear passage of air through the enclosure and into the engine area is enhanced.

Accordingly, there is provided a screening apparatus which accomplishes maximum filtration of air flowing into a vehicle engine and which may also be attached or removed from a vehicle securely and with ease.

BRIEF DESCRIPTION OF THE DRAWINGS

FIG. 4 is a view similar to FIG. 3, but illustrating the inside of the enclosure.

FIG. 5 is view of the enclosure similar to that in FIG. 4.

FIG. 7 is an exploded view of the components comprising the enclosure assembly.

FIG. 8 is an enlarged partial view of a segment of screening used with the enclosure.

FIG. 9 is an enlarged and elevated perspective view of a frame member of the enclosure.

FIG. 9a is a section view of the enclosure taken along lines 9a–9a of FIG. 9.

DESCRIPTION OF THE PREFERRED EMBODIMENT

Figure 1:
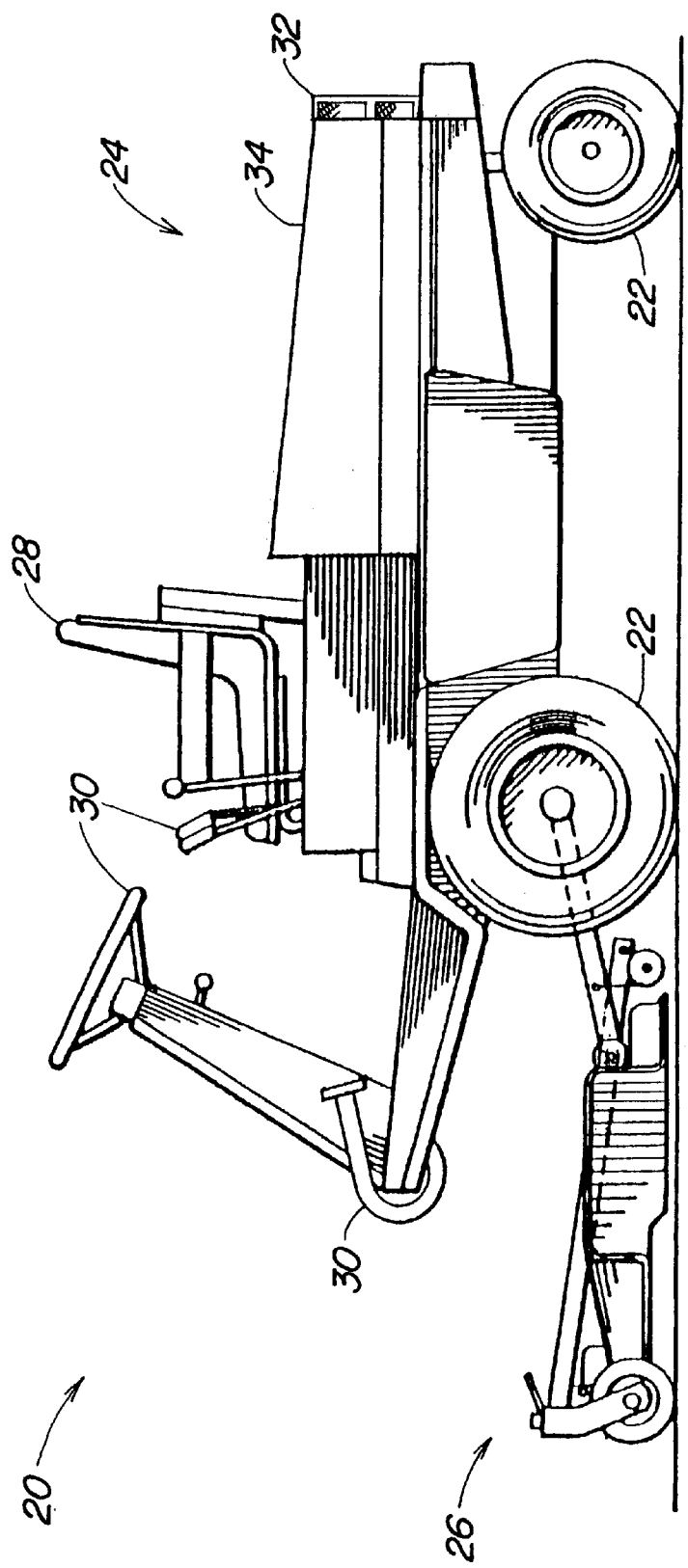
FIG. 1 is a side view of a riding mower having the filtering enclosure of the present invention attached thereto.

As illustrated in FIG. 1, there is shown a vehicle in the form of a riding mower 20 supported upon ground engaging wheels 22 and having a drive and driven portion 24, 26, respectively. Further included is a seating apparatus 28 for accomodating an operator and positioned so as to allow the operator to be within easy reach of the mower drive controls 30. Forming a rear of the mower 20 is an air filtration device in the form of a screened enclosure 32, as seen in FIG. 1, and which is housed below a hood 34 of the mower 20.

Figure 2:
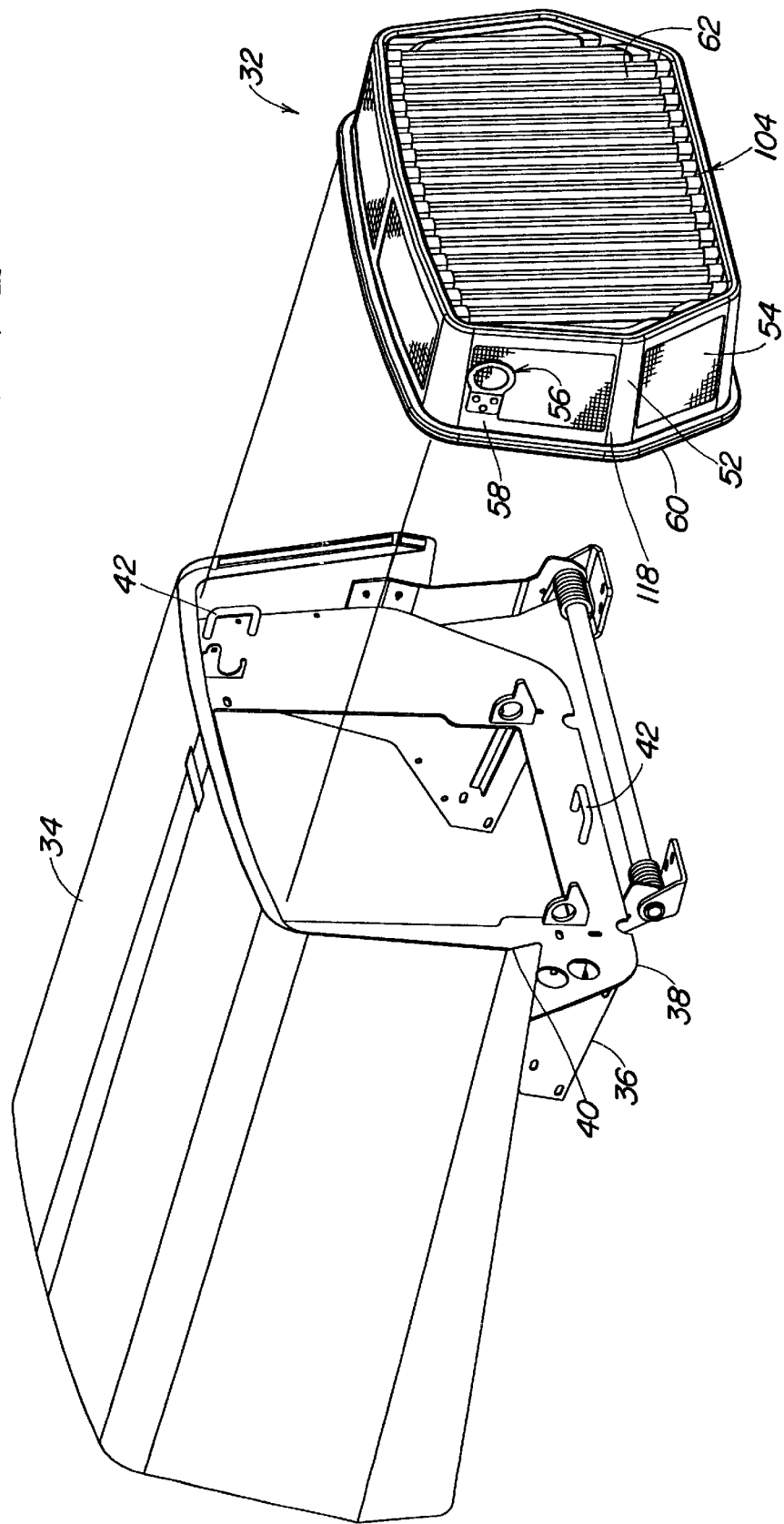
FIG. 2 is an enlarged and exploded left rear and elevated perspective view of the enclosure and rear portion of the mower.

Looking now to FIG. 2, attachment of the enclosure 32 to a frame portion 36 of the mower 20 is shown. Specifically, the enclosure 32 is fitted in proximity to and against a radiator plate 38 which frames and/or supports an upstanding radiator (not shown) for the vehicle 20. Once enclosure 32 is fitted beyond an outer peripheral edge 40 of and underneath hood 34, the enclosure 32 connects with brackets or catches 42 welded to plate 38 so as to secure the enclosure 32 to the plate 38 and thus also, to brackets 36 which are available for connection with the frame of the vehicle 20.

Figure 3:
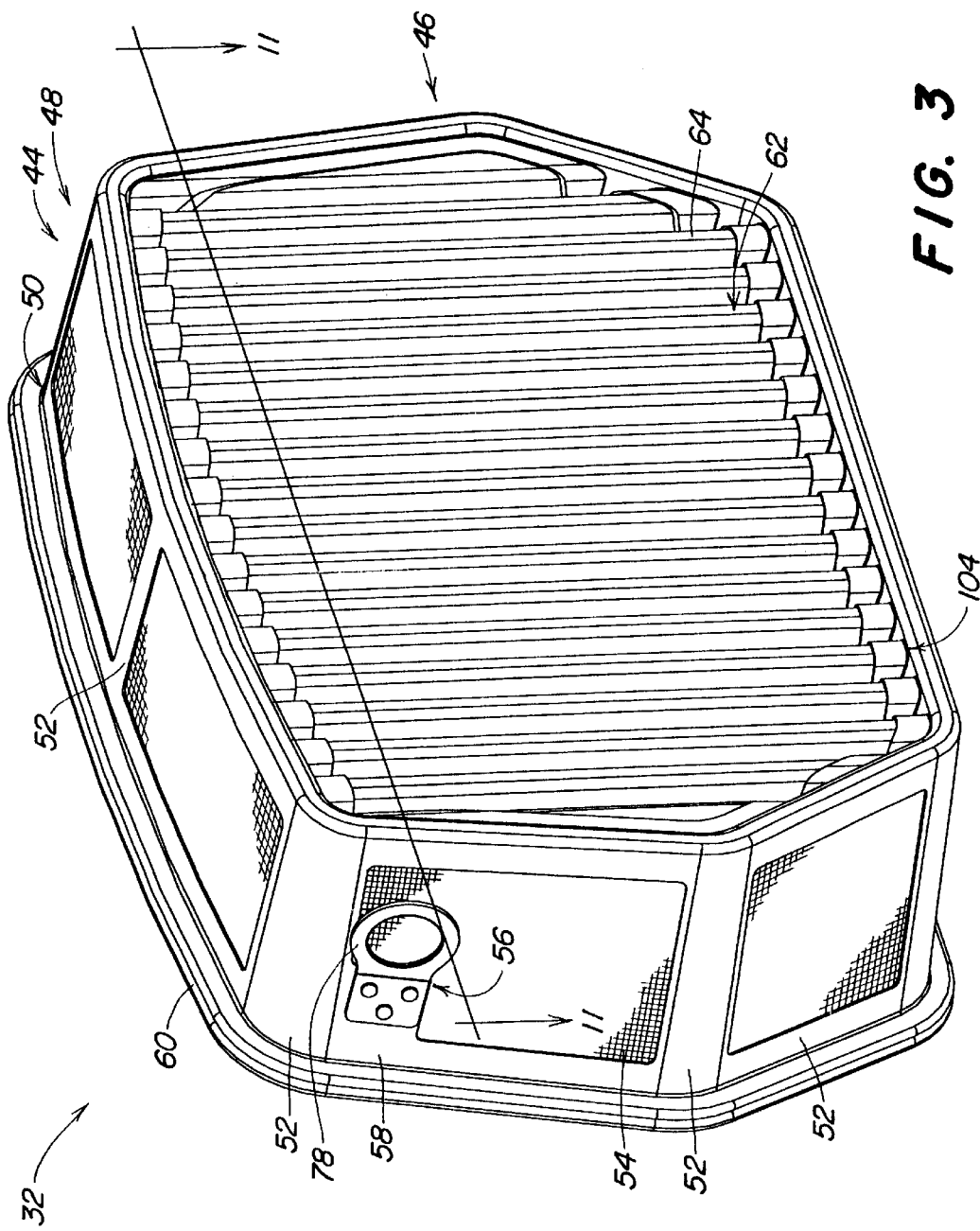
FIG. 3 is an enlarged and elevated perspective view of the enclosure.

Referring to FIG. 3, enclosure 32 includes an exterior surface 44 including a front side 46, intermediate sides 48 and rear side 50. Intermediate sides 48 include connected vertical and horizontal partitions 52 spaced throughout and have screening portions 54 interposed between the partitions 52. Handles 56 are bolted onto an extension 58 contained in each of two identical, yet parallel partitions 52 as best seen in FIGS. 4 and 5. Adjoined to the rear side 50 of the enclosure 32 is a seal 60, preferably made of rubber, for use in sealing the enclosure 32 to the plate 38, as seen specifically in FIG. 6a as well as in FIG. 11a. Included at the front side 46 of the enclosure 32 is a sheet 62 of undulating screening, preferably made of metal and having perforations therethrough, and having vertically wavering portions or ribs 64 throughout. One of ordinary skill in the art will recognize that materials other than metal may be used in the construction of the provided screening. The undulations 64 may also be provided in a horizontal pattern. However, it is preferred, in this embodiment, that they be provided in a vertical configuration so as not to create a shelf upon which debris may lie.

Figure 6:
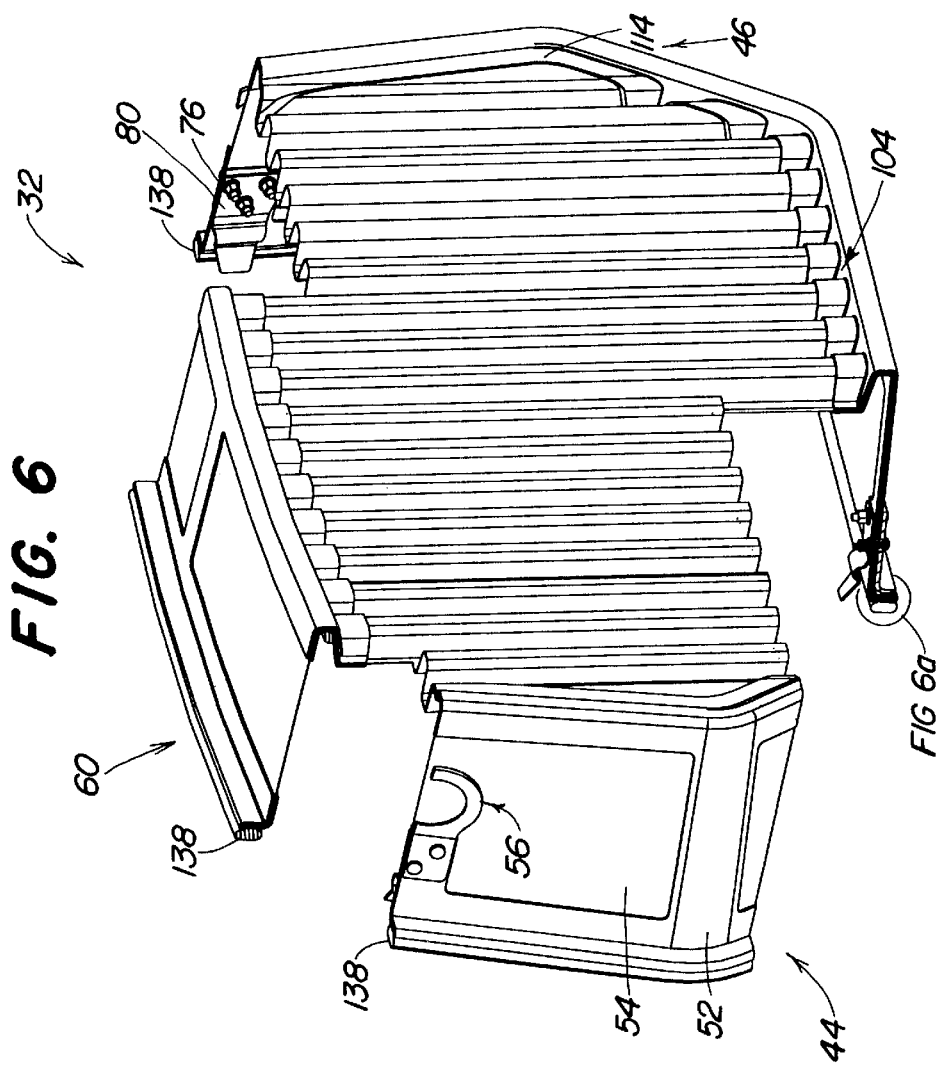
FIG. 6 is a partial cutaway view of the enclosure illustrating the enclosure construction.
Figure 6A:
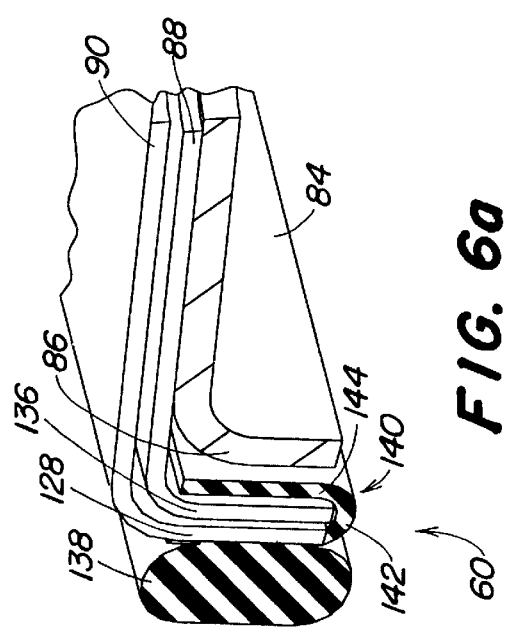
FIG. 6a is a sectional view of the sealing strip utilized between the two shell members of enclosure assembly.

Both FIGS. 4 and 5 illustrate a left and right rear perspective of the enclosure 32, respectively. As shown by both figures, the enclosure 32 incorporates a pair of left and right clips 66 and center clip 68 respectively, each of which is mounted to an interior side 70 of at least three of the partitions 52. Clips 66, 68 are spring assisted and maintain both a buckled portion 72 and upwardly inclined portion 74, and are attached to the partition 52 with fastening devices 76 such as bolts and nuts. Held opposite clips 66 on the exterior 44 of enclosure 32 are the handles 56 which include a circular loop 78 that may be grasped so as to maneuver the enclosure 32. As shown in FIG. 5, each of clips 66 and handles 56 include flattened mounting plates 80, 82 extending therefrom, respectively. When assembled, as shown in FIGS. 4 and 5, mounting plates 80, 82 align with each other relative to interior and exterior surfaces 70, 44 of the enclosure 32. Buckled portion 72 and loop 78 extend laterally opposite one another about an axis extending transversely to each of the clips 66 and handle 56 so as not to exert unnecessary forces on enclosure 32 upon removal or installation on vehicle 20. Additionally, to absorb forces applied to center clip 68 when enclosure 32 is installed onto or removed from the vehicle 20, exterior surface 44 includes a brace or stiffening plate 84 attached thereto, as seen in FIG. 6a. Brace 84 includes a downwardly bent tongue 86 which compresses against seal 60, as best shown in FIG. 6a. Attachment of brace 84 is made by use of the same bolt and nut combination 76 as is used to connect center clip 68 to enclosure 32, as illustrated in FIG. 6.

Assembly of the enclosure 32 is shown in FIGS. 7 and 8. Included as part of its construction is a frame assembly consisting of both an exterior and interior, or alternatively first and second shell members 88, 90, respectively. Each member is constructed in substantially similar fashion and of similar material, preferably plastic allowing for lightweight design, with the exception that interior member 88 is slightly smaller in dimension when compared with exterior member 90. Thus, manufacture of only the interior member 90 will be discussed in detail. As also seen in FIG. 9, interior member 90 consists of a front edge 92, intermediate sides 94 and rear edge 96. Adjacent a border 98, shown in FIG. 9a, of front bottom edge 92 is a transversely and rearwardly extending sill or shoulder 100 that receives a wave-shaped screen mounting structure 102. A similarly shaped screen mounting structure 104, shown in FIG. 7, is provided in the other shell member 88 that would be positioned adjacent the wave-shaped structure 102 in the first shell member 90 with the screen element 62 being sandwiched between the two wave-shaped structures 102 and 104. Since the two wave-shaped structures 102 and 104 are essentially identical, only the one illustrated in FIG. 9 will be discussed in detail.

The wave-shaped screen mounting structure 102 is of a generally sinusoidal shape with alternating vertically extending fore and aft spaced ribs 106. The ribs 106 are connected with web portions 108 to provide a generally U-shaped channel or slot 110.

Sill 100 continues upward from the left and right junctures 112 from front bottom side 92. Interconnecting the web 102 beyond the junctures 112 are straight extensions 114 of the sill 100. Intermediate side 94 contains hollowed segments or openings 116 defined by partitions 52 spaced at unequal intervals throughout. Along side 94, portions 118 of at least two partitions 52 are angled so as to allow left and right sections 120, 122 of side 94 to maintain a outwardly bowed configuration with sections 120, 122 extending both upwardly and downwardly on either side of the bow 124.

As further seen in FIG. 9, partition 52 extends upwardly from the bow 124 and includes an extension 58. Holes 126 are formed therein so as to allow reception of bolts 76 used to secure clips 66 and handles 56 on either side of extension 58. At a rear side 96 of interior member 90 is an outwardly extending ledge or edge 128 provided along its entire length, as seen in FIG. 7.

As shown in FIG. 7, two sheets 130 of perforated screening having apertures 132 illustrated in detail by FIG. 8, are brought together to overlay intermediate side 94. Apertures 132 provide openings in screens 130 to allow the attachment of fastening devices 76 to each of extensions 58.

Figure 10:
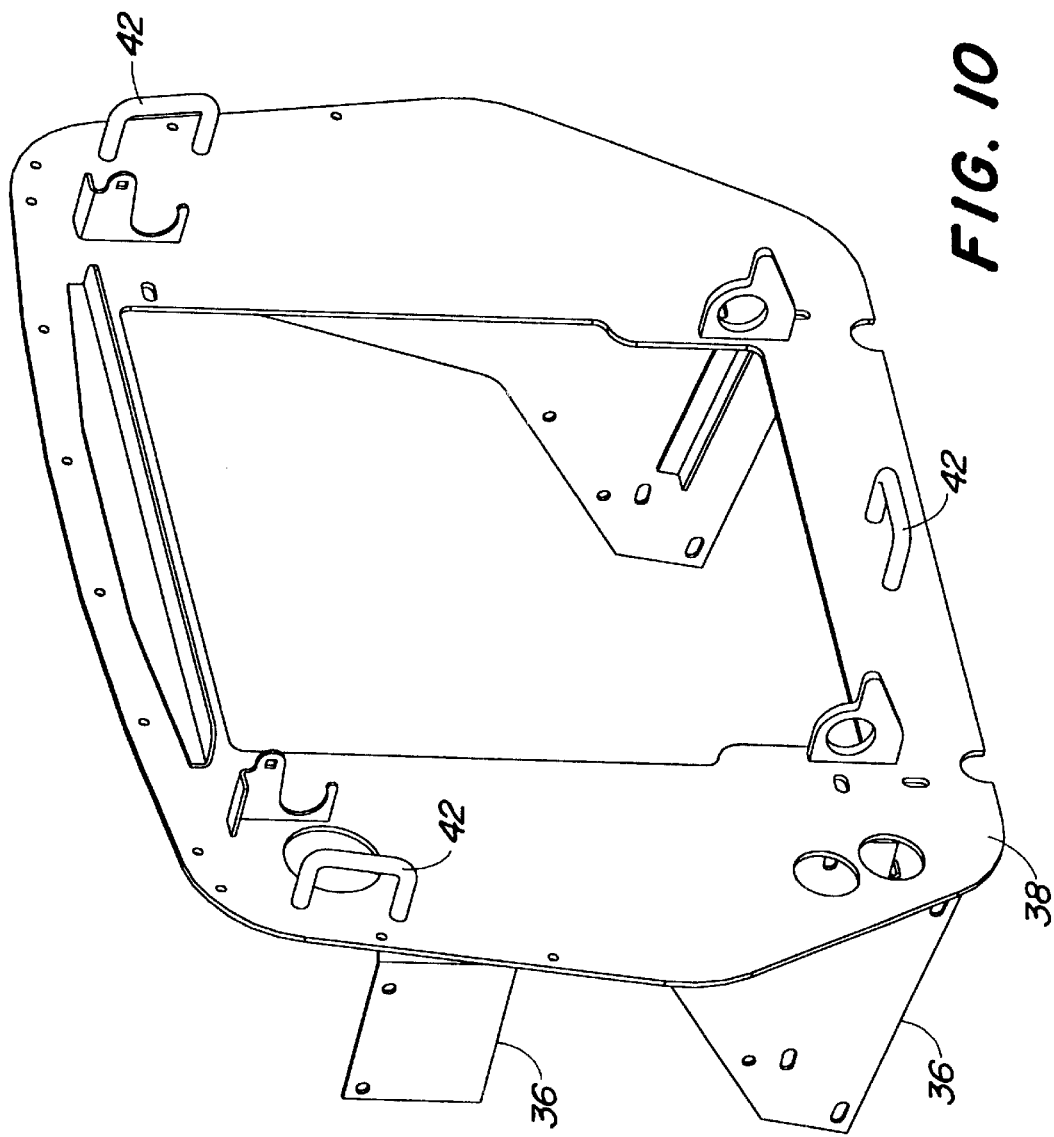
FIG. 10 is an enlarged front perspective view of a plate carried by the mower frame and to which the radiator and enclosure are attached.
Figure 11:
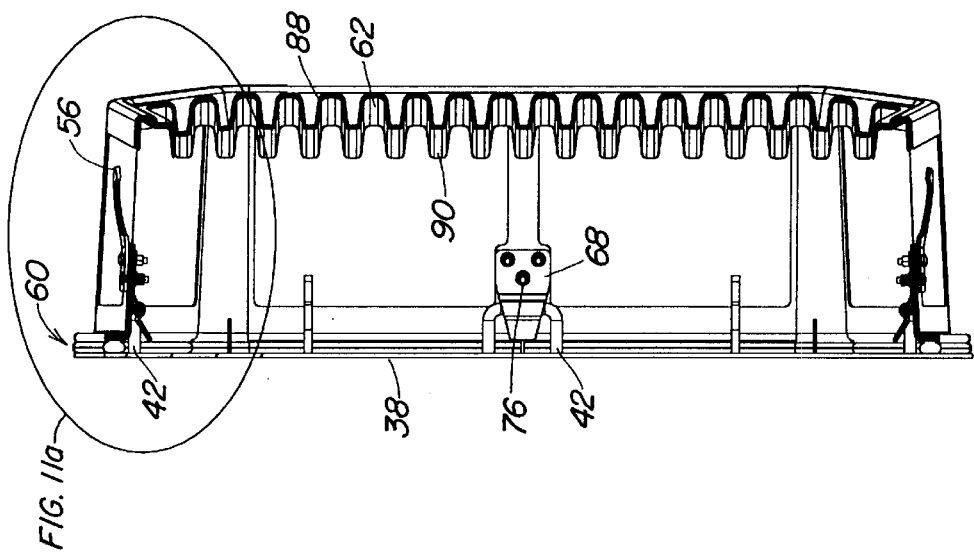
FIG. 11 is a section view of the enclosure taken along lines 11—11 of FIG. 3.

Looking now to FIGS. 6 and 10–11, screens 62 and 130, exterior member 88 and interior member 90 together form a sealed frame that restricts entry of foreign matter or debris at their joint from passing into the radiator and surrounding engine area. With focus on FIGS. 6 and 11, coupling of interior and exterior members 88 and 90 to sandwich screens 62 and 130 is shown. This construction provides a housing or frame assembly in the form of a shell 134 with screens 130 covering hollowed portions 116 extending between partitions 52 and screen 62 positioned at the front of each of the members 88 and 90.

To assemble enclosure 32 which is illustrated in an exploded fashion to form the shell-like structure 134 illustrated in FIG. 3, screening panel 62 is seated within and adhesively mounted on sill or shoulder 100 to the wave shaped structure 102 of interior member 90. Next, the two screening sheets 130 are mounted to the side 94. Exterior member 88 is then pressed onto interior member 90 and thus, encases sheets 130 and screening panel 62. Members 88 and 90 are held securely together by use of an adhesive placed on an inside surface of partitions 52 so as to hold the members 88 and 90 together when overlay of members 88 and 90 takes place. Additionally, seal 60 is attached to edges 128 and 136 of both interior and exterior members 90, 88 respectively, as seen in both FIGS. 7 and 11–11a. Finally, clips 66 and 68 and handles 56 are attached to surface 44 of exterior member 88 through connection to extensions 58. Connection is accomplished upon installation of nut and bolt combination 76.

Looking as well to FIGS. 3–5, allowing for the easy removal and reinstallation of the enclosure 32 to the vehicle 20 without the use of tools or other hardware, clips 66, 68 permit adjustment of the enclosure 32 with the catches 42 formed on radiator plate 38. Attachment may be accomplished by the operator maneuvering enclosure 32 into alignment with catches 42 through use of handles 56. Thereafter, each buckled portion 72 of the clips 66 presses against or is clasped against each of catches 42, an instance of which is shown in FIG. 11, so as to secure the enclosure 32 to the plate 38 and thus, to the vehicle 20. Removal of the enclosure 32 from the vehicle 20 is achieved by the operator grasping loop 78 of handle 56 and pulling, thereby allowing the buckled portion 72 to slide free of each catch 42 to disengage enclosure 32 from the plate 38.

Sealing of the enclosure 32 to the vehicle 20 is permitted by compression of seal 60 against the radiator plate 38. Attachment of the strip 60 to the shell 134 is seen best in FIGS. 6a, 11 and 11a. Seal 60 includes a bumper 138 in the form of an elongated member to which is adjoined a U-shaped extension 140, comprising rubber having a metal stiffening component therein (unshown) and having legs 142, 144, as shown in FIG. 6a. As again seen in FIG. 6a, edges of members 88, 90 fit between legs 142, 144 when enclosure 32 is fully assembled.

Figure 11A:
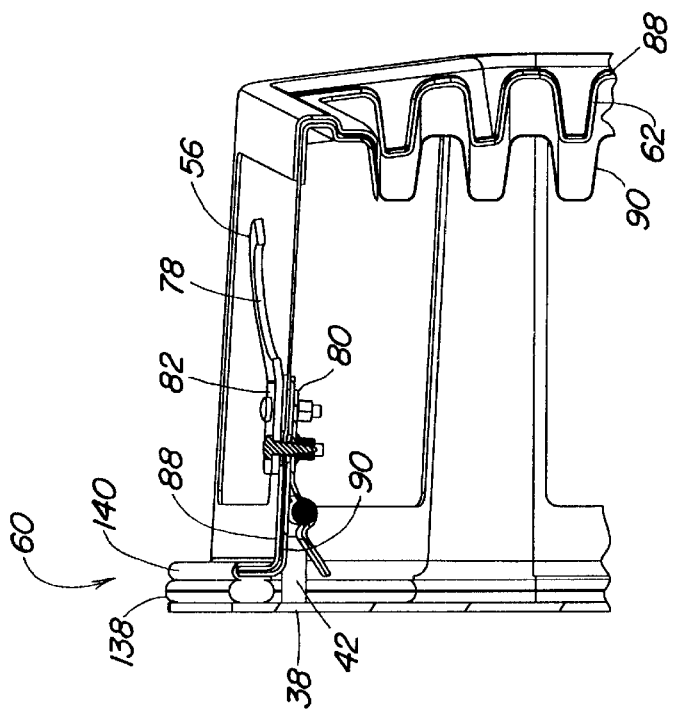
FIG. 11a is a partial sectional view of a corner of the enclosure illustrating the clip and handle assembly.

Sealing of enclosure 32 to plate 38 is further assisted when spring-assisted clips 66, 68 latch onto catches 42. As buckled portion 72 clasps onto catch 42, bumper 138 is compressibly forced into abutment with plate 38 so as to ensure constant and uniform contact therewith, as seen in FIG. 11a. Further and as shown in FIG. 2, after enclosure 32 has been seatably positioned against plate 38, the outward bow created by portions 118 in the partitions 52 reduce the space between the enclosure and the hood to decrease the area through which debris may enter. Accordingly, the likelihood and amount of debris entering the radiator and surrounding engine area is greatly diminished.

With the instant invention, there is provided an enclosure assembly 32 which effectively limits the amount and type of debris which can enter the engine compartment of a vehicle. Additionally, provision of clips 66, 68 on an interior of enclosure 32 permits an aesthetically pleasing and streamlined appearance often desired by operator's of lawn and garden equipment such as riding mowers.

While the present invention has been described in conjunction with a specific embodiment, it is understood that many alternatives, modifications, and variations will be apparent to those skilled in the art in light of the foregoing description. Accordingly, this invention is intended to embrace all such alternatives, modifications and variations which fall within the spirit and scope of the appended claims.

We claim:

1. An enclosure, comprising:
    a) a shell having side portions and front and back edges, the portions and edges defining an interior;
    b) screening carried within the interior of the shell, the screening including undulating portions carried adjacent the front edge of the shell, the shell including a frame assembly which houses the screening, the frame assembly including interior and exterior members, the interior member being receivable within and bonded to the exterior member, the interior and exterior members each including a front edge and a series of slots for receiving the undulating portions;
    c) a means for securing the shell to mounting structure carried on a vehicle, the means being located on the interior of the shell and including a plurality of spring clips; and
    d) handles provided on the exterior member adjacent at least two of the clips.

2. A vehicle, comprising:
    a) a frame supported upon a plurality of ground engaging wheels;
    b) a shell having front and back edges and side portions defining an interior and being attachable to the frame, the shell including an interior and exterior member, the interior member being fixedly received within the exterior member, each of the interior and exterior members including partitions placed throughout their sides, the partitions defining openings in the sides;
    c) screening carried within the interior of the shell, the screening including undulating portions positioned adjacent the front edge of the shell;
    d) a means for securing the shell to the vehicle, the means located on the interior of the shell and including a spring assisted clip mounted on each of at least three of the partitions within the interior member; and
    e) a handle provided for use in positioning the shell and which is bolted to the shell opposite two of the spring clips.

3. A vehicle, comprising:
    a) a frame supported upon a plurality of ground engaging wheels;
    b) a shell having front and back edges and side portions defining an interior and being attachable to the frame, the shell including an interior and exterior member, the interior member being fixedly received within the exterior member, each of the interior and exterior members including partitions placed throughout their sides, the partitions defining openings in the sides;

c) screening carried within the interior of the shell, the screening including undulating portions positioned adjacent the front edge of the shell;

d) a means for securing the shell to the vehicle, the means located on the interior of the shell and including a spring assisted clip mounted on each of at least three of the partitions within the interior member; and e) handles provided for use in maneuvering the shell, each of which is bolted to the shell opposite a spring clip.

4. A vehicle, comprising:

a) a frame supported upon a plurality of ground engaging wheels;

b) a shell having front and back edges and side portions defining an interior and being attachable to the frame, the shell including an interior and exterior member, the interior member being fixedly received within the exterior member, each of the interior and exterior members including partitions placed throughout their sides, the partitions defining openings in the sides;

c) screening carried within the interior of the shell, the screening including undulating portions positioned adjacent the front edge of the shell;

d) a means for securing the shell to the vehicle, the means located on the interior of the shell and including a spring assisted clip mounted on each of at least three of the partitions within the interior member; and e) handles provided for use in maneuvering the shell, each of which is bolted to the shell opposite a spring clip, the frame including brackets on which the spring clips matingly engage so as to secure the shell to the frame.

5. A vehicle, comprising:

a) a frame supported upon a plurality of ground engaging wheels;

b) a shell having front and back edges and side portions defining an interior and being attachable to the frame, the shell including an interior and exterior member, the interior member being fixedly received within the exterior member, each of the interior and exterior members including partitions placed throughout their sides, the partitions defining openings in the sides;

c) screening carried within the interior of the shell, the screening including undulating portions positioned adjacent the front edge of the shell;

d) a means for securing the shell to the vehicle, the means located on the interior of the shell and including a spring assisted clip mounted on each of at least three of the partitions within the interior member;

e) handles provided for use in maneuvering the shell, each of which is bolted to the shell opposite a spring clip, the frame including brackets on which the spring clips matingly engage so as to secure the shell to the frame; and f) a seal which surrounds the back edge of the shell so as to prevent the introduction of debris therein.

6. A vehicle, comprising:

a) a frame supported upon a plurality of ground engaging wheels;

b) a shell having front and back edges and side portions defining an interior and being attachable to the frame, the shell including an interior and exterior member made of plastic, the interior member being fixedly received within the exterior member, each of the interior and exterior members including partitions placed throughout their sides, the partitions defining openings in the sides;

c) screening carried within the interior of the shell, the screening including undulating portions positioned adjacent the front edge of the shell, the screening being made of perforated metal;

d) a means for securing the shell to the vehicle, the means located on the interior of the shell and including a spring assisted clip mounted on each of at least three of the partitions within the interior member;

e) handles provided for use in maneuvering the shell, each of which is bolted to the shell opposite a spring clip, the frame including brackets on which the spring clips matingly engage so as to secure the shell to the frame; and f) a seal which surrounds the back edge of the shell so as to prevent the introduction of debris therein.

* * * * *